Oct. 23, 1962 E. C. KARP 3,059,709
AUTOMATIC COMPUTING WEIGHING MECHANISM
Filed Jan. 30, 1958 2 Sheets-Sheet 2

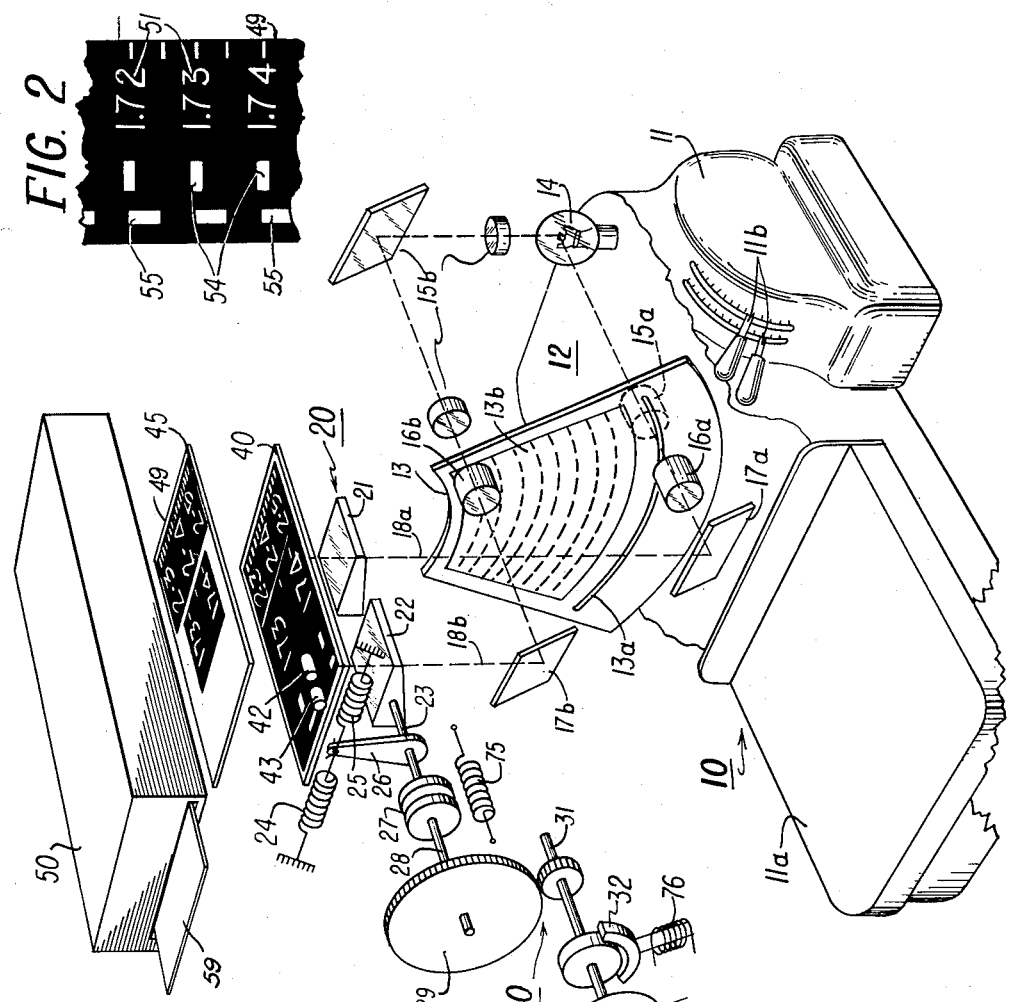

INVENTOR.
Edward C. Karp
BY
Byron Hume Groen & Clement Attys.

United States Patent Office 3,059,709
Patented Oct. 23, 1962

3,059,709
AUTOMATIC COMPUTING WEIGHING
MECHANISM
Edward C. Karp, Belvidere, Ill., assignor to Sanitary Scale Co., Belvidere, Ill., a corporation of Illinois
Filed Jan. 30, 1958, Ser. No. 712,120
5 Claims. (Cl. 177—5)

The present invention relates to weighing mechanisms and particularly to weighing mechanisms adapted to automatically compute to the nearest whole cent the value of a commodity sold at a given price per weight.

Self-service type of merchandising as employed in grocery stores and supermarkets has encouraged prepackaging operations for certain commodities such as meats and vegetables wherein the commodity is packaged in a transparent wrapper, priced and displayed for the inspection and the choosing of the customer. It provides a convenience without causing spoilage and is economical in that the services of the clerk or attendant at the commodity counter may be devoted entirely to prepackaging.

Presently, prepackaging may be accomplished manually by the attendant wrapping the commodity, weighing it, interpolating both weight and computed value at the given price per pound, then manually, or by actuating a printing device, marking a label or ticket with the weight, price and value of the package. The label or ticket is then attached to or wrapped with the commodity. Such an operation is slow and susceptible to human error both in interpolation and in recording.

Alternately, mechanisms are available for performing some or all of these operations with presentation of a label or ticket showing the weight of the commodity and its computed value to the nearest whole cent. Mechanisms of this type, however, necessarily and typically include a weighing device for determining weight, a computer for determining value at such weight, rationalizing means to adjust such determined value to the nearest whole cent and a printer for printing the ticket or label including the actual weight and computed value to the nearest whole cent. The obvious and greatest difficulty experienced in the development of such weighing apparatus is in providing an arrangement that is capable of performing such functions and yet is free of mechanical, electromechanical or other linkage which introduces resistance and lag, affecting the accuracy and speed of the unit. Such mechanisms generally and additionally are complex, difficult to maintain and relatively expensive.

It is a general object of the present invention to provide a simple and improved automatic weighing device that is capable of presenting weight and computed value information promptly and accurately.

Another object of the invention is to provide a rationalization system for a digital information display of the type normally presented by a computing weighing scale which will permit the presentation and display only of whole numbers.

An additional object of the invention is to provide a weighing mechanism having a weight and a computing price scale wherein only whole numbers are displayed by the price scale.

An additional object of the invention is to provide a weighing mechanism which will present a display showing the actual weight of a commodity and its price to the nearest whole cent.

A further object of the invention is to provide a weighing mechanism including an arrangement for determining the weight of a commodity and for determining from such weight its value to the nearest whole cent and for thereafter reproducing such weight and value information on a sales ticket or directly onto the packaged commodity being weighed.

Further objects and features of the invention pertain to the particular structure and arrangements whereby the above-identified objects are attained. The invention, both as to its structure and method of operation, will be better understood by reference to the following specification and drawings forming a part thereof wherein:

FIGURE 1 is a schematic representation in perspective of the mechanical components employed in the weighing device of the invention;

FIGURE 2 is an enlarged view of one of the price scales employed in the weighing mechanism illustrated in FIGURE 1;

FIGURE 4 shows the rationalized price to the nearest whole cent of a weighed article as presented to the reproducer in the arrangement of FIGURE 1.

Figure 3:
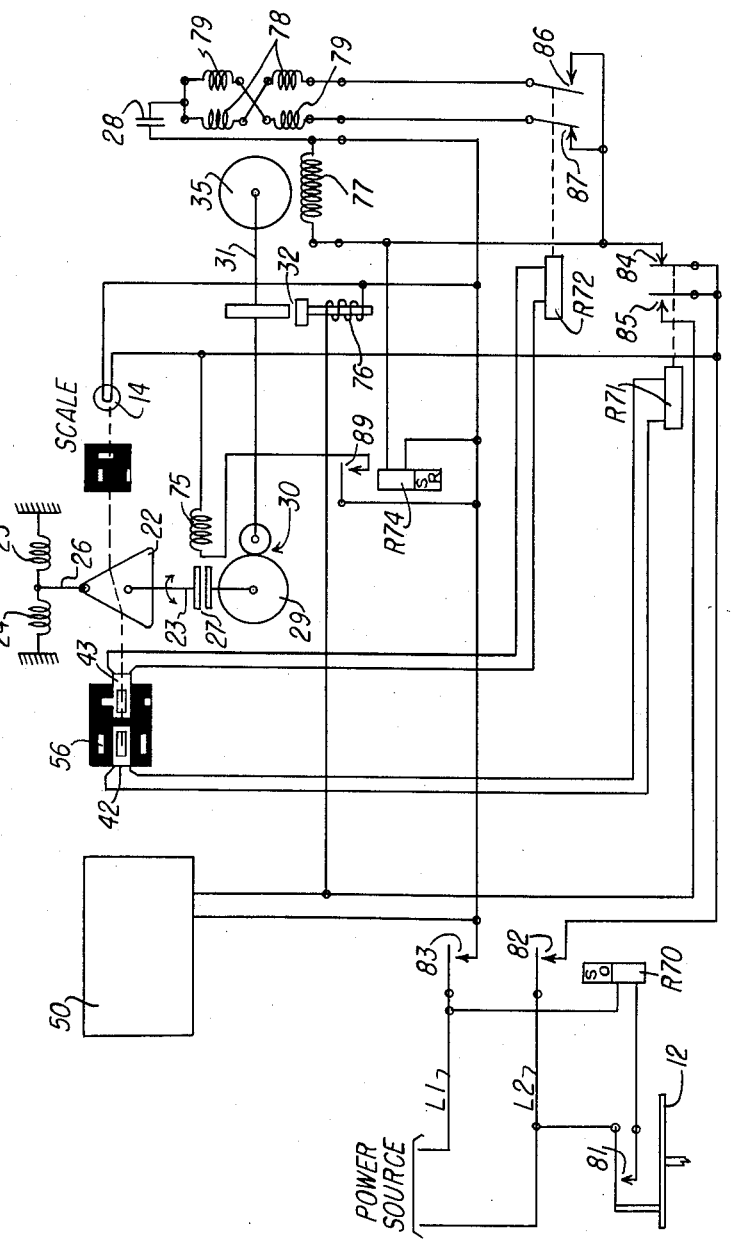
FIGURE 3 is a schematic diagram of the electrical control circuit for the weighing device of the invention.

Referring to the drawings, there is shown in FIGURE 1 the mechanical components of a weighing mechanism in accordance with the invention including a weighing mechanism 10, light deflecting arrangement 20, a deflector drive 30, an image screen 40 and an image reproducer 50. The weighing mechanism 10 is of the computing kind preferably but not necessarily of the type shown in the United States Patent No. 2,793,025, issued to E. Kuhnle on May 21, 1957, and in United States Patent No. 2,769,590, issued to E. Kuhnle on November 6, 1956. The weighing mechanism 10 includes a housing 11 shown broken away to reveal the weighing apparatus 12 and includes a weighing pan or platform 11a and price scale selector apparatus 11b. The weighing apparatus 12 is preferably of the type that projects an image of the weight scale and of a price scale and includes a chart reticle 13 carrying thereon a weight scale 13a and a plurality of price scales represented by the block 13b in FIGURE 1. Light rays from a source 14 are directed by means of a condensing system 15a to the weight scale 13a and by means of a condensing system 15b to a selected one of the price scales 13b. The image formed by the light rays directed to the weight scale 13a are projected by means of a projection system 16a and a mirror 17a into a path 18a and the image formed by the light rays directed through the particular one of the price scales 13b are projected by means of a projection system 16b and a mirror 17b in a path 18b.

Arranged in the projection path of the scale images is the deflector arrangement 20 comprising a deflector 21 intercepting the projection path 18a of the image of the weight scale 13a and a deflector 22 intercepting the projection path 18b of the image of the selected one of the price scale 13b. The deflectors 21 and 22 should have the same deflecting properties and may be reflecting mirrors or refracting optical bodies such as the prisms shown in FIGURE 1. The deflector 21 is in a fixed position and the deflector 22 is supported in any suitable manner for rotation about the axis of a shaft 23. The deflector 22 is biased in a normal position by opposing springs 24 and 25 acting on a lever arm 26 connected to the prism 22. The shaft 23 is connected to a reversible drive motor 35 through a clutch 27, a shaft 28, a gear train 29, and a shaft 31 operated on by a brake 32. With the clutch 27 engaged, the drive arrangement 30 is effective for rotating the deflector 22 in reverse directions against the forces applied by the springs 24 and 25. When the clutch 27 is disengaged, the deflector 22 returns to its normal position in alignment with the deflector 21.

For purposes of presenting a visual display, an image of each of the deflected projections may be formed on an image screen, as at 40, provided with a discrete registration area aligned with the pick-up apertures of a pair of photo-sensitive devices 42 and 43. Beyond the image screen may be positioned a mask 45 for blocking off unnecessary portions of the image registered on the image screen. Beyond the mask 45 may be positioned an image recorder 50 for producing a permanent record of the image framed within the open area of the mask 45. The reproducer 50 may be selected from the variety of types of image producers available, the choice being not critical to the practice of this invention. However, an electrostatic type of reproducer is preferred at present, because of its speed, simplicity and availability. The electrostatic reproduction process is described in the RCA Review, December 1954, vol. XV, No. 4, pages 469–484. One kind of electrostatic process developed by RCA is known as "Electrofax" and another kind of electrostatic process developed by the Haloid Company, of Rochester, New York, is known as "Xerox."

If a reproducer is employed in the system and depending upon the type of reproducer used, the image screen 40 may be omitted, or alternatively, provision may be made in the system for causing a projection for visual display and another projection to be utilized by a reproducer.

Considering for the moment the details of the weighing mechanism 10, the particular one of the price scales 13b employed at any one time is selected by means of the price scale selector apparatus 11b in a manner as is described in detail in the previously referred to Kuhnle Patents No. 2,793,025 and No. 2,769,590. For example, assuming that the weighing mechanism 10 is to be employed for purposes of determining the weight and value of a commodity which is priced to sell at 77 cents per pound, the lever arms of the price scale selector apparatus 11b are adjusted to cause the condensing system 15b and the projection system 16b to be moved across the price scales 13b of the chart reticle 13 to select that price scale capable of computing prices at the stated price per pound. Each price scale including the price scale so selected, is a dark substantially opaque strip 49 made up of numerical and pattern portions as shown in FIGURE 1 and as best illustrated by the enlarged showing of FIGURE 2. The numerical portion includes spaced apart numerical combinations 51 corresponding to values in dollars and cents, and the pattern portion is made up of translucent areas 54 and 55 whereof the translucent areas 54 are primary markers corresponding to the numerical combinations 51 and the translucent areas 55 are secondary markers corresponding to one terminal half of the spacing between the numerical combinations 51.

The primary and secondary markers 54 and 55 are utilized in a manner as described hereinafter to effectuate control of the deflector 22 by means of the drive arrangement therefor in order to cause any fractional cent indication appearing at the image screen 40 to be rationalized to the nearest full cent indication.

Referring to FIGURE 3, the schematic representation of the control circuit shown therein includes a slow to operate start relay R70, the pair of photo-sensitive devices 42 and 43, a photo-electric relay R71 associated with the photo-sensitive device 42 and the photo-electric relay R72 associated with the photo-sensitive device 43. In addition there is included a slow-to-release relay R74 effective for energizing the inductor portion 75 of the magnetic clutch structure 27. In addition there is provided the inductor 76 associated with the brake 32, a field winding 77 for the motor 35 and the pole windings 78 and 79 for the motor 35.

Considering now the mode of operation of the weighing device in accordance with the invention, and assuming that a price of 77 cents per pound has been preset in the mechanism as previously explained, and that an article weighing 2 pounds and 4 ounces is placed on the weighing pan 11a of the weighing mechanism 10, switch contacts 81 are closed responsive to the displacement of the pan from its normal position for energizing the winding of the relay R70. However, as the relay R70 is of the slow-to-operate type, it does not operate for a time interval sufficient to permit the weighing mechanism to come to equilibrium and to permit constant image to be projected from the chart reticle 13, through the deflectors 21 and 22 and onto the image screen 40. Thereafter the relay R70 operates and closes contacts 82 and 83 for energizing the control circuit to perform the functions described hereinafter.

Initially, with the closing of contacts 82 and 83 an obvious circuit including the clutch winding 75 and contacts 89 of relay R74 is prepared for engaging the clutch unit 27. As the relay R74 is not operated at this time, the contacts 89 are opened and the circuit is incomplete.

As noted from FIGURES 1 and 3, the photo-sensitive devices 42 and 43 are positioned at the image screen 40 for association, respectively, with the images of the primary markers 54 and with the images of the secondary markers 55. Assuming that the image projected is that as shown on the image screen 40 of FIGURE 1, the photo-sensitive device 42 reads an image of the opaque portion 49 and the photo-sensitive device 43 reads an image of the translucent portion 55. In this circumstance the photo-electric relay R71 associated with the photo-sensitive device 42 is not operated so that the contacts 84 thereof are closed and the photo-electric relay R72 associated with the photo-sensitive device 43 is operated so that the normally closed contacts 86 thereof are opened and the normally opened contacts 87 thereof are closed. In this circumstance, a circuit is completed from the power source through contacts 82 and 84, and then in multiple through the field winding 77 of the motor 35, through the winding or relay R74 and through contacts 87, the pole windings 79 and the capacitor 28, and thence via the contacts 83 to the power source. Accordingly, the mentioned windings are energized so that at the relay R74 the contacts 89 are closed for energizing the winding 75 and engaging the clutch 27 so that the motor 35 is coupled to the deflector shaft 23 for the purposes of reversibly rotating the shaft and the deflector prism 22 connected thereto. Due to the energization of the field winding 77 and the pole winding 79, the motor 35 is operated to cause rotation of the shaft 23 in a counter-clockwise direction so that the deflector prism 22 is rotated in the counter-clockwise direction and moves the position of the image projected onto the image screen 40 until the image of the one primary marker corresponding to the value number "1.73" in FIGURES 1 and 3 is read by the photo-sensitive device 42. Thereupon, the relay R71 operates to open contacts 84 for de-energizing the motor 35 and de-energizing the slow to release relay R74. Additionally, contacts 85 are closed to complete a circuit for operating the reproducer 50 and for energizing the brake winding 76 associated with the brake unit 32. Accordingly, the motor 35 is de-energized and braked and the reproducer 50 is operated to produce a permanent record of the display appearing in the open portion of the mask 45 as shown in FIGURE 4. Thereafter, the relay R74 restores to open contacts 89 whereby the clutch windings 75 is de-energized to disengage the clutch unit 27 so that the deflector prism 22 is restored to its normal position, and at approximately the same time the weighed article is removed from the pan 11a of the weighing mechanism so that the contacts 81 are opened and the relay R70 restored to interrupt the operating circuit. At this time then, the reproducer 50 has prepared a ticket 59 carrying thereon the actual weight of the article so weighed and its value to the nearest whole cent, which ticket may be packaged with the weighed article, and the system is prepared to weigh and value another article.

Considering further the operation of the control circuit and assuming the circumstance in which the price of the weighed article is such that the photo-sensitive device 42 and the photo-sensitive device 43, at the image screen 40 both read an image of the opaque portion 49, both photo-electric relays R71 and R72 remain in their restored positions so that contacts 84 and 86 are closed and the clutch winding 75, the field winding 77 and the pole windings 78 of the motor 35 are energized to cause rotation of the shaft 23 in a clockwise direction and a rotation of the deflector prism 22 in a clockwise direction. Accordingly, the image of the portion 49 is deflected on the image screen 40 in the reverse direction until the photo-sensitive device 42 reads the image of the primary marker nearest thereto. At that time then the relay R71 is operated to de-energize and brake the motor 35 and the reproducer 50 is operated to produce a ticket showing the actual weight of the article placed on the pan and the value of the article so weighed to the nearest whole cent. Thereafter, the relay R74 restores to disengage the clutch unit 27 and the article is removed from the pan 11a causing the relay R70 to restore and the control circuit to be de-energized.

It is to be appreciated that the reproducer 50 may be arranged so that alternative to producing a ticket showing the weight and the value of an article, it may cause the weight and the value of the article to be printed directly on its wrapper. Additionally, provision may be made for projecting with the weight indication and the value indication, the price per pound indication so that the latter information may be included on the ticket or printed directly onto the package. Additionally, it is to be understood that if it is desired to conserve price scale chart areas, the primary markers 54 in each of the price scales corresponding to the numerical combinations 51 may be omitted and the numerical combinations may be used in association with the photo-sensing device 43 for purposes of primary registration. In this instance, suitable means would be provided for preventing interference by the photo-sensing device with the numerical display as by splitting the projection beam 18b in order to produce one image for control and another image for display or reproduction.

In view of the foregoing, it is obvious that there has been described herein a new and improved arrangement for a price computing weighing machine wherein the actual weight on an object is displayed and the price of that object is determined to the nearest whole cent. Provisions are made within the control circuit for the improved arrangement permitting the association therewith of a reproducing device whereby the actual weight and the price to the nearest whole cent of an article weighed can be reproduced on a ticket. The advantages of this arrangement are not only that an object may be weighed and automatically priced to its nearest full cent thereby eliminating the human errors present in prepackaging operations, but that such operation may be done rapidly and may be productive of a ticket showing price and weight which can be used as a price slip for merchandising the article.

While the arrangement disclosed herein is at present considered to be preferred, it is understood that many of the structural arrangement employed such as the type of weighing mechanism and reproducer, the form of the price scale and the like, are arbitrary selections and that variations and modifications may be made therein without departing from the principles of the invention, and it is intended to cover in the appended claims all such modifications as fall within the true spirit and scope of the invention.

What is claimed is:

1. An automatic recording system comprising a weighing mechanism including a platform for receiving an article to be weighed, a scale presenting a display of spaced apart numerals selected by said weighing mechanism in accordance with the displacement of said platform by an article placed thereon, means for projecting an image of said scale, a deflector in the projection path of said scale image, driving means for moving said deflector to selectively deflect the projection path of said image, an image screen positioned to intercept the deflected image of said scale and including a discrete registration area thereon, means for recording the image registered at said discrete registration area, and control means responsive to the non-registration of a numeral image in said discrete registration area for operating said driving means thereby to further deflect said projection path for achieving registration of a numeral image in said discrete area and responsive to the registration of a numerical image in said discrete area for operating said recording means.

2. An automatic recording system comprising a weighing mechanism including a platform for receiving an article to be weighed, a scale presenting a display of spaced apart numerals selected by said weighing mechanism in accordance with the displacement of said platform by an article placed thereon, said scale further presenting primary markers associated with said numerals and secondary markers associated with the spacing therebetween extending over one terminal half of each spacing, means for projecting an image of said scale, a deflector in the projection path of said scale image, reversible driving means for reversibly moving said deflector to selectively deflect the projection path of said image, an image screen positioned to intercept the deflected image of said scale and including a discrete registration area thereon, means for recording the numerical portion of said image registered at said discrete registration area, a first photo-sensitive device positioned at said discrete area for association with images of said primary markers normally operative in a first condition and operative into a second condition responsive to the registration of a primary marker image at said discrete area, a first circuit associated with said first photo device controlled responsive to said first condition thereof for energizing said driving means and controlled responsive to said second condition thereof for de-energizing said driving means and for operating said recording means, a second photo-sensitive device positioned at said discrete area for association with images of said secondary markers normally operative in a first condition and operative into a second condition responsive to the registration of a secondary marker image at said discrete area, and a second circuit associated with said second photo device controlled responsive to said first condition thereof for operating said energized driving means in one direction and controlled responsive to said second condition thereof for operating said energized driving means in the reverse direction, thereby to deflect the projection path for registering the nearest primary marker image in the discrete area of said image screen, whereby the nearest numeral is registered in the discrete area of said image screen and is recorded.

3. An automatic recording system comprising a weighing mechanism including a platform for receiving an article to be weighed, a scale presenting a display of spaced apart numerals selected by said weighing mechanism in accordance with the displacement of said platform by an article placed thereon, said scale further presenting primary markers associated with said numerals and secondary markers associated with the spacing therebetween extending over one terminal half of each spacing, means for projecting an image of said scale, a deflector in the projection path of said scale image, said deflector being biased in a normal position in said projection path and being rotatable in reverse directions from said normal position, reversible drive means for reversibly rotating said deflector, clutch means engaged for connecting said drive means to said deflector, braking means on said drive means, an image screen positioned to intercept the deflected image of said scale and including a discrete registration area thereon, means for recording the numerical portion of the image registered at said discrete registration area, a first photosensitive device positioned at said discrete area for association with images of said primary markers normally operative in a first condition and operative into a second condition responsive to the registration of a primary marker image at said discrete area, a first control circuit associated with said first photo device controlled responsive to said first condition thereof for energizing said driving means and for engaging said clutch means and controlled responsive to said second condition thereof for de-energizing said driving means and for operating said braking means and said recording means and for thereafter disengaging said clutch, a second photo sensitive device positioned at said discrete area for association with images of said secondary markers normally operative in a first condition and operative into a second condition responsive to the registration of a secondary marker image at said discrete area, and a second circuit associated with said second photo device controlled responsive to said first condition thereof for operating said energized driving means in one direction and controlled responsive to said second condition thereof for operating said energized driving means in the reverse direction, thereby to deflect the projection path for registering the nearest primary marker image in the discrete area of said image screen, whereby the nearest numeral is registered in the discrete area of said image screen and recorded and thereafter said deflector is released to restore to said normal position.

4. An automatic recording system comprising a weighing mechanism including a platform for receiving an article to be weighed, a scale presenting a display of spaced apart numerals definitive of weight and a correlated display of spaced apart numerals definitive of price per weight, said scale further presenting primary markers associated with said price numerals and secondary markers associated with the spacing therebetween extending over one terminal half of each spacing, said weighing mechanism selecting a portion of said scale in accordance with the displacement of said platform, means for projecting an image of said selected portion of said scale, a first fixed deflector in the projection path of said weight numeral images, a second deflector in the projection path of said price numeral images and said primary and secondary marker images, said second deflector being biased in a normal position aligned with the postion of said first deflector and being rotatable in reverse directions from said normal position, reversible drive means for reversibly rotating said second deflector, clutch means engaged for connecting said drive means to said second deflector, braking means on said drive means, an image screen positioned to intercept the deflected image of said scale and including a discrete registration area individual to the image deflected by said second deflector, means for recording the numerical images registered at said image screen, a first photo sensitive device positioned at said discrete earea for association with images of said primary markers normally operative in a first condition and operative into a second condition responsive to the registration of a primary marker image at said discrete area, a first control circuit associated with said first photo device controlled responsive to said first condition thereof for energizing said driving means and for engaging said clutch means and control responsive to said second condition thereof for de-energizing said driving means and for operating said braking means and said recording means and for thereafter disengaging said clutch, a second photo sensitive device positioned at said discrete area for association with images of said secondary markers normally operative in a first condition and operative into a second condition responsive to the registration of a secondary marker image at said discrete area, and a second circuit associated with said second photo device controlled responsive to said first condition thereof for operating said energized driving means in one direction and controlled responsive to said second condition thereof for operating said energized driving means in the reverse direction, thereby to rotate said second deflector for registering the nearest primary marker image in the discrete area of said image screen, whereby the nearest price numeral image is registered in the discrete area and images of a weight numeral and of said price numeral are recorded and thereafter said second deflector is released to restore to said normal position.

5. An automatic recording system comprising a weighing mechanism including a platform for receiving an article to be weighed, a scale presenting a display of spaced apart numerals definitive of weight and a correlated display of spaced apart numerals definitive of price per weight, said scale further presenting primary markers associated with said price numerals and secondary markers associated with the spacing therebetween extending over one terminal half of each spacing, said weighing mechanism selecting a portion of said scale in accordance with the displacement of said platform, means for projecting an image of said selected portion of said scale, a first fixed deflector in the projection path of said weight numeral images, a second deflector in the projection path of said price numeral images and said primary and secondary marker images, said second deflector being biased in a normal position aligned with the position of said first deflector and being rotatable in reverse directions from said normal position, reversible drive means for reversibly rotating said second deflector, clutch means engaged for connecting said drive means to said second deflector, braking means on said drive means, an image screen positioned to intercept the deflected image of said scale and including a discrete registration individual to the image deflected by said second deflector, means for recording the numerical images registered at said image screen, a first photo sensitive device positioned at said discrete area for association with images of said primary markers normally operative in a first condition and operative into a second condition responsive to the registration of a primary marker image at said discrete area, a first control circuit associated with said first photo device controlled responsive to said first condition thereof for energizing said driving means and for engaging said clutch means and controlled responsive to said second condition thereof for de-energizing said driving means and for operating said braking means and said recording means and for thereafter disengaging said clutch, a second photo sensitive device positioned at said discrete area for association with images of said secondary markers normally operative in a first condition and operative into a second condition responsive to the registration of a secondary marker image at said discrete area, and a second-circuit associated with said second photo device controlled responsive to said first condition thereof for operating said energized driving means in one direction and controlled responsive to said second condition thereof for operating said energized driving means in the reverse direction, and means responsive to the displacement of said weighing platform for energizing said first and second control circuits a predetermined period thereafter in order to permit said weighing mechanism to come to equilibrium before permitting operation of said circuits for registering the nearest primary marker image in said discrete area, whereby the nearest price numeral image is registered in the discrete area and images of a weight numeral and of said price numeral are recorded and thereafter said second deflector is released to restore to said normal position.

References Cited in the file of this patent

UNITED STATES PATENTS

| | | |
|---|---|---|
| 2,517,246 | Seitz | Aug. 1, 1950 |
| 2,563,892 | Waller | Aug. 14, 1951 |
| 2,769,590 | Kuhnle | May 21, 1957 |
| 2,857,803 | Reinecke | Oct. 28, 1958 |
| 2,864,278 | Sparks | Dec. 16, 1958 |

FOREIGN PATENTS

| | | |
|---|---|---|
| 461,651 | Great Britain | Feb. 22, 1937 |